United States Patent [19]

Weniger et al.

[11] Patent Number: 5,038,038

[45] Date of Patent: Aug. 6, 1991

[54] OPTICAL SENSOR FOR DETECTING QUANTITY OF PROTECTIVE COATING

[75] Inventors: Richard J. Weniger; Ernest A. Franke, both of San Antonio; Glynn R. Bartlett, Leon Valley, all of Tex.

[73] Assignee: Southwest Research Institute, San Antonio, Tex.

[21] Appl. No.: 349,684

[22] Filed: May 9, 1989

[51] Int. Cl.⁵ .............................................. G01N 21/01
[52] U.S. Cl. .................................... 250/339; 250/341; 250/345
[58] Field of Search ...................... 250/339, 341, 345; 356/445

[56] References Cited

U.S. PATENT DOCUMENTS 3,631,526 12/1971 Brunton .............................. 250/341
3,994,586 5/1976 Sharkins et al. ..................... 250/341

Primary Examiner—Jack I. Berman
Assistant Examiner—Richard Hanig
Attorney, Agent, or Firm—Pravel, Gambrell, Hewitt, Kimball & Krieger

[57] ABSTRACT

An optical sensor which can be used in conjunction with an automatic stripping apparatus. A plurality of sensing elements are placed in a predetermined geometrical relationship with respect to a plurality of nozzles which deliver paint stripping material. Each of the sensing elements comprises a lens system which optimizes inspection of the desired field of view while minimizing the effects of light from outside the desired field of view. The sensing elements produce optical signals which are converted into electrical signals by a plurality of optical detectors. The signal output of the plurality of detectors is analyzed using a programmable digital computer which is used to control a robotic positioning system.

9 Claims, 4 Drawing Sheets

OPTICAL SENSOR FOR DETECTING QUANTITY OF PROTECTIVE COATING

Statement of Governmental Interest

The U.S. government has right in the present invention pursuant to Air Force Systems Command Contract No. F33615-86-C-5044, entitled "Robotic Paint Stripper Cell (RPSC)". The U.S. government has a nonexclusive, nontransferable, irrevocable paid up license to practice or have practice for or on behalf of the U.S. this invention throughout the world.

Field of the Invention

The present invention relates generally to optical sensors. More specifically, the present invention provides an improved optical sensor for detecting the quantity of a protective coating, such as paint, which is deposited on a surface.

Background

Protective coatings such as paint serve many purposes, including protection from moisture, sunlight, and other environmental conditions. On military aircraft, protective coatings, including various types of paint, are used to form camouflage patterns to make the aircraft less visible. New coats of paint are often applied to change camouflage patterns or to change unit insignia patterns which aircraft move from one squadron or region of the world to another. Furthermore, new coats of paint are applied periodically to improve the appearance of the aircraft. Since it is much easier in field operation to simply put another coat of paint on top of existing paint, it is not uncommon to find that, as years go by, military aircraft often have as many as 12 coats of paint. Eventually, the weight of this paint is sufficient to effect the operational characteristics of the aircraft.

Paint and other protective coatings must be removed from aircraft in order to allow detailed surface inspection, to perform other rework and repair operations, and to keep the weight of the aircraft within acceptable levels. In the past, paint removal procedures have employed chemical paint strippers for removing paint. However, as environmental awareness has increased, the cost of disposal of toxic chemicals such as phenols has become prohibitive.

Recently, there has been major interest in finding an economical, environmentally safe substitute for chemical paint stripping. One proposed method involves plastic media blasting (PMB), which involves blasting the surface of an aircraft with small plastic pellets in a manner similar to sandblasting. PMB is currently used in manual installations in a number of military and commercial operations. The resulting waste material is much less toxic than phenol or other chemical strippers. However, PMB methods require manipulation of very heavy hoses while standing on an aircraft wing covered with a layer of plastic beads. Such conditions create a high potential for loss of footing, thus representing a hazard to the operator.

Determining the amount of paint covering a surface is not an easy task. The task is complicated by the fact that many different colors and patterns of paint are used on several different types of substrate materials. In many cases white or silver paints are used on aluminum, dark blue or black decals are placed over paint in places where the aircraft substrate material is black and graphite-epoxy composite. In addition, the sensing must be performed as the plastic beads are being blasted on the surface, with the air hazy from paint dust, and with the paint pattern continually changing.

Sensing the amount of paint on the surface of the aircraft is not an easy task even for human operators. When they see a dark area in a white region it is often difficult to distinguish dark decal over white paint from a region where white paint has been stripped off a composite surface. Operators often combine prior knowledge of the surface to reach decisions. For example, if the dark area appears in a region where they have not yet blasted, they will assume it is a decal. On the other hand, if it occurs in a region where they have blasted and saw white earlier, they will assume the dark area to be a black composite substrate.

Ideally, the PMB process should be fully automated to remove human operators from the aforementioned hazardous environment. Such an automated system would involve the use of large robotic systems comprising sensors which are capable of obtaining consistent and satisfactory results. A major problem associated with such paint stripping robot systems is the ability to control the stripping process. Control of the process requires knowledge of how much of the paint has been removed and how much of the paint remains on the surface. It is apparent therefore, that such an automated system requires a sensor which is capable of determining the amount of paint remaining on the surface and which can withstand a harsh blasting environment.

Summary of the Invention

The present invention overcomes the difficulties of the prior art by providing an optical sensor which can be used in conjunction with an automatic stripping apparatus that is controlled by a robotic system. In the sensor of the present invention, a plurality of sensing elements are placed in a predetermined geometrical relationship with respect to a plurality of nozzles which deliver the paint stripping material. Each of the sensing elements comprises a lens system which optimizes inspection of the desired field of view while minimizing the effects of light from outside the desired field of view. The sensing elements produce optical signals which are converted into electrical signals by a plurality of optical detectors. The optical detectors are coupled to the optical sensing elements by a plurality of optical fibers. Each of the detectors comprises two photosensitive devices, such as photodiodes, to provide electrical signal representations of the condition of the surface to be stripped. A bandpass filter is placed in front of each of the photodiodes. The center wavelengths of the bandpass filters are separated by a large enough range to ensure effective operation of the sensor.

The signal output of the plurality of detectors is analyzed using a programmable digital computer which is used to control a robotic positioning system. In the preferred embodiment of the present invention, four sensing elements are aligned in a linear pattern to obtain information relating to the blast stream. In addition, first and second calibration sensing elements are positioned to provide reference signals for use by the four sensing elements in the blast stream. Reference signals corresponding to protective coating and bare substrate are obtained by positioning the calibration sensors over a pure sample of protective coating, such as paint, and over bare substrate, such as aluminum. The first sensing element is positioned ahead of the row of blast nozzles and the second sensing element is positioned behind the row of blast nozzles. Under normal operating circumstances, the first sensing element will see only protective coating and the second calibration sensing element will see only bare substrate.

Brief Description of the Drawings

FIG. 2b is an illustration of the relative placement of the sensing fields and the blast fields for the elements shown in FIG. 2a.

Detailed Description the Preferred Embodiment

Figure 1:
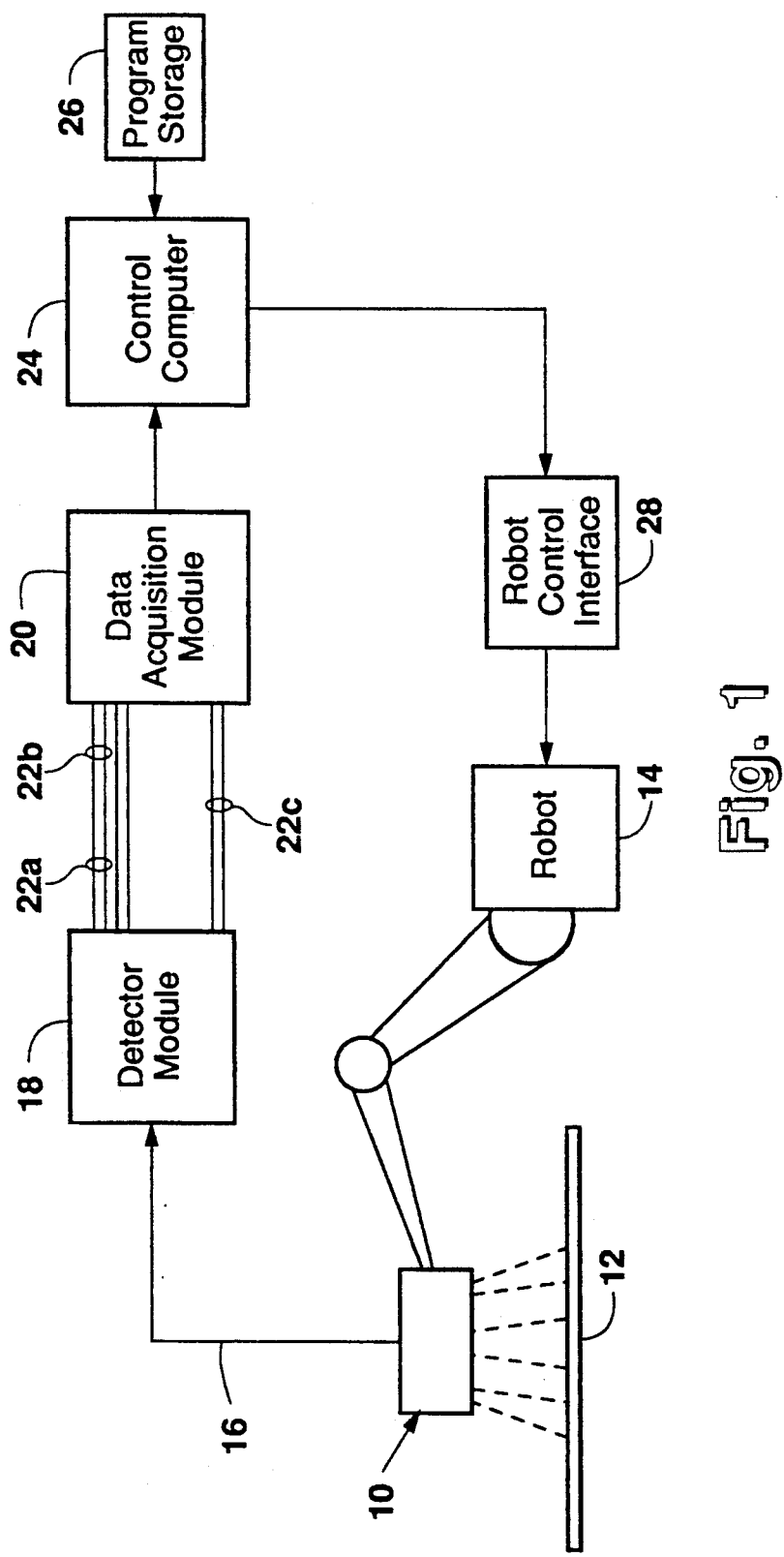
FIG. 1 is a schematic block diagram showing the optical sensor of the present invention in conjunction with data processing equipment and a robotic positioning system.

Referring to FIG. 1, a schematic block diagram is shown of a stripping system employing the optical sensor system of the present invention. A stripping head assembly 10 is shown positioned over a portion of material or "substrate" 12 to be stripped. The dashed lines shown in FIG. 1 represent the field of view of the optical sensors, discussed in greater detail below. The blast pattern of the stripping material is approximately the same as the field of view of the center row of sensors shown in FIG. 1. The position of the stripping head is controlled by a robot 14.

All physical materials exhibit a unique reflectance spectra over the optical wavelengths spanning ultraviolet through infrared. In particular, the optical reflectance spectra of paint and aluminum differ in the amount of infrared light absorbed and the amount reflected. Paint (particularly the polyurethane based paints used on aircraft) absorbs more light and reflect less at longer wavelengths. Careful measurement of the absorption or reflectance spectra can be used to differentiate a protective coating, such as paint, from the underlying substrate.

The disadvantage of complete spectral analysis is the time required to measure reflectance at a large number of wavelengths, compare the spectral pattern to patterns of known materials, and then determine the type of material. The time required can be reduced by measuring at a smaller number of optical wavelengths provided the reflectance characteristics of the materials are sufficiently different at the wavelengths selected. The sensor described here is based on the measurement of reflectance at two wavelengths.

As will be discussed in greater detail below, two electro-optic sensors are used, one to measure the reflected light in a spectral band centered at a wavelength of 900 nm and the other in a band centered at 1700 nm. This separation in wavelength has proven to provide an adequate difference to distinguish between paint and substrates. The reflected light in each wavelength range sample can be determined by optical bandpass filters with center passbands at wavelengths specified or by combinations of high and low pass optical filters. Because Silicon detectors operate very well in the near infrared region, they are used for the 1700 nm wavelength. Other types of detectors, such as Lead-Sulfide and Aluminum-Gallium-Arsenide, could also be used for these measurements.

The stripping head 10 contains a plurality of sensing elements, discussed in greater detail below, which are used to obtain information relating to the percentage of paint or other protective coating remaining on the substrate. The output of the sensing elements is carried by a fiber optic bundle 16 which is connected to a detector module 18, comprising a plurality of individual detector elements, discussed below in connection with FIG. 4, which are operable to convert the optical signals from each of the sensing elements into a voltage signal which can be transferred to a data acquisition system 20. As will be discussed below, each of the detector elements comprises two photosensitive devices, such as photodiodes. Therefore, each of the detector elements will produce two output voltages representing filtered optical signals. The respective pairs of output signals are illustrated generally by reference numerals 22a–22c.

The signals received by the data acquisition system 20 are converted, using techniques known in the art, into data signals which can be used by control computer 24. The control computer uses an algorithm stored in program storage 26 to process the data signals to determine the effectiveness of the stripping process and to provide appropriate control signals to robot control interface 28. The robot 14 can thus be controlled to move the stripping head 10 over the surface 12 in a manner to optimize the stripping process.

Figure 2A:
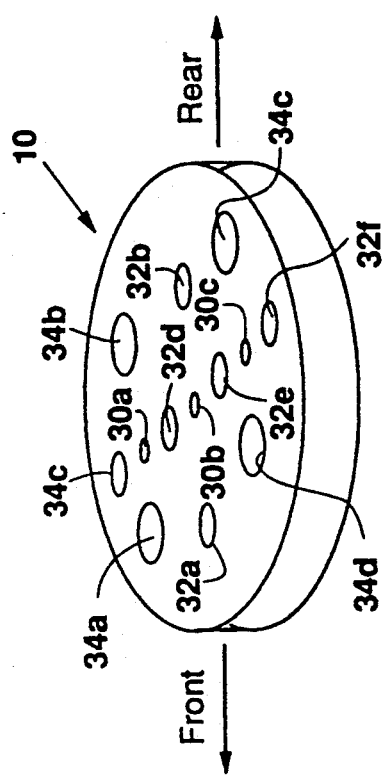
FIG. 2a is a perspective illustration of the stripping head showing the placement of nozzles for delivering the stripping material and the placement of the optical sensing elements.

Referring to FIG. 2a, a perspective view of the stripping head is shown to provide information relating to the placement of the optical sensing elements relative to the nozzles for delivering stripping material. As was discussed above, one popular method for stripping protective coatings, such as paint, is the use of plastic media blasting (PMB), which involves blasting the surface with small plastic pellets in a manner similar to sandblasting. The present disclosure does not provide details relating to the operation of the PMB system, since such systems are well known in the art.

In the preferred embodiment of the present invention, PMB materials are delivered through nozzles 30a, 30b, and 30c, which are aligned in alinear pattern within the stripping head, as shown in FIG. 2a. First and second optical calibration sensors 32a and 32b, respectively, are positioned in the stripping head to provide reference signals which can be used to determine the effectiveness of the stripping process. For purposes of discussion, optical sensing element 32a will be referred to as the front calibration sensing element and element 32b will be referred to as the rear calibration sensing element. Light to illuminate the surface 12 is provided by a plurality of light sources 34a–34d arranged in a pattern to provide uniform lighting of the surface 12. In the preferred embodiment of the invention, the light sources are halogen bulbs which produce infrared-rich light.

Figure 2B:
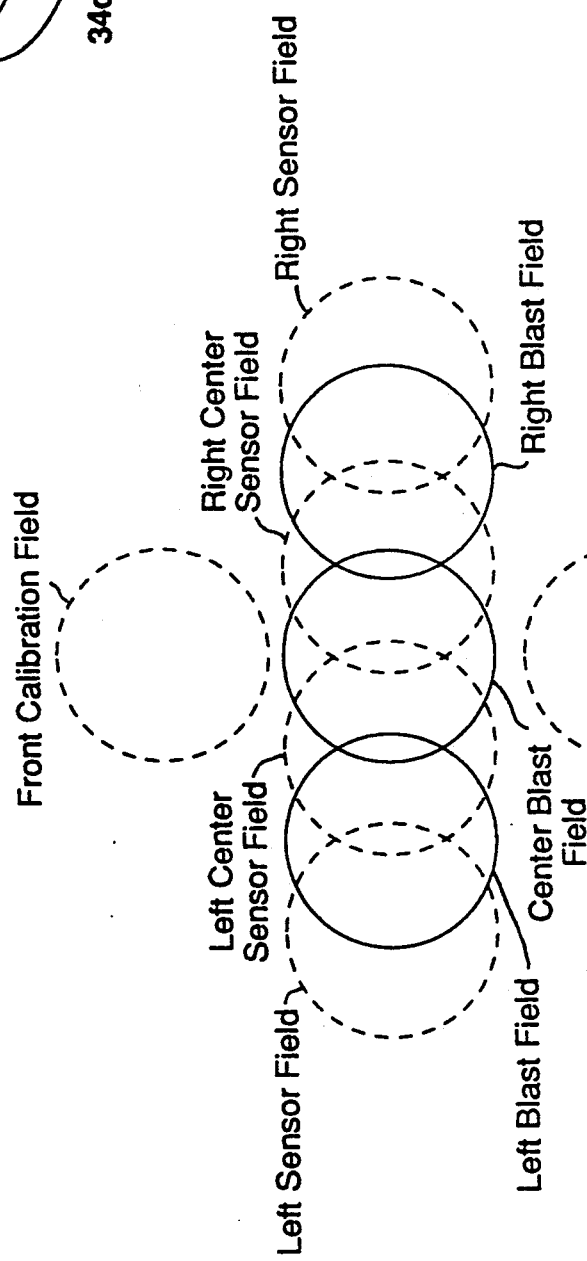

FIG. 2b is an illustration of the operational field of each of the nozzles 30a–30c and the optical sensors 32a–32e. For example, the front calibration field would correspond to the optical field of view for optical sensing element 32a and the rear calibration field would correspond to the field of view for rear calibration sensing element 32b. The left and right center sensor fields correspond to the fields of view for optical sensing elements 32e and 32d, respectively. Finally, the left and right sensor fields correspond to the field of view for sensing elements 32f and 32c, respectively. The center blast field corresponds to the stripping field for nozzle 30b and the center blast field and left blast field correspond to the stripping area for nozzle 30a and 30c, respectively. The information obtained from each sensor element is the average over the field of view for that element. This average signal value can be compared to reference calibration signal values for paint and bare substrate, to obtain a quantitative estimate of the percentage of coating remaining on the substrate.

Figure 3:
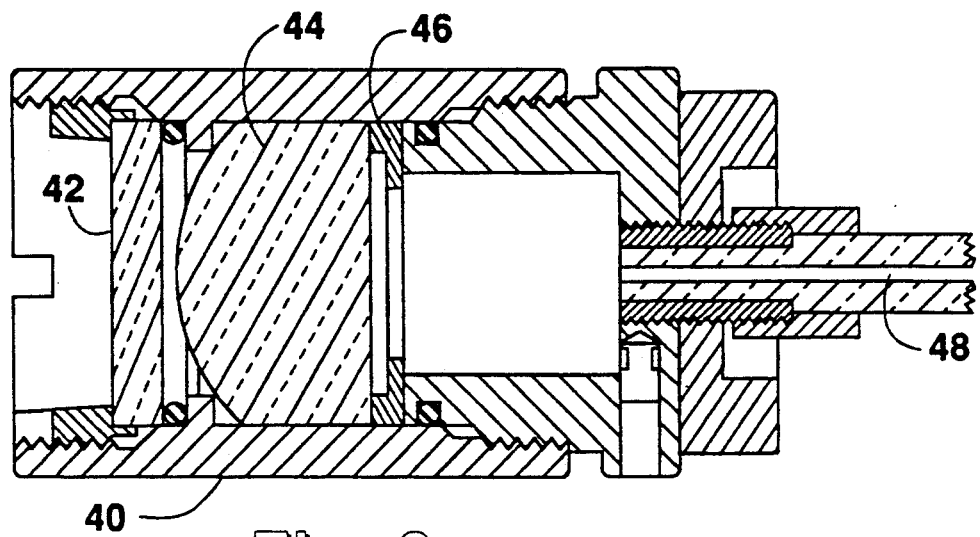
FIG. 3 is an elevational cross sectional view of a sensing element used in the present invention.

The sensing elements 32a–32f are identical to one another, with each element having the components shown in FIG. 3. The sensing element, designated generally by reference numeral 32, is contained in a generally tubular housing 40 having a protective lens 42 attached on one end thereof. A lens element is adapted to receive light through the protective lens and to focus the optical image through an aperture 46 onto the termination of a fiber optic cable 48 for transmission to the detector elements contained in the detector module 18. The lens system of the preferred embodiment is designed to narrow the field of view of the sensor to approximately the size of the blast pattern, while gathering a large amount of light reflected from the surface 12. The aperture 46 serves to eliminate light rays coming into the system from outside the desired field of view. The size of the aperture determines the amount of light which will be gathered by the sensor. The distance of the lens from the fiber bundle affects the amount of light which will be gathered by the fiber cable. Although more light is gathered as the distance is decreased, the fiber bundle cannot be moved too close to the lens or none of the light will be gathered. The system has been optimized to insure maximum transmission of light, within the constraint posed by the distance between the blast nozzles. In the preferred embodiment of the invention, the lens assembly has an outer diameter of approximately one inch.

Figure 4:
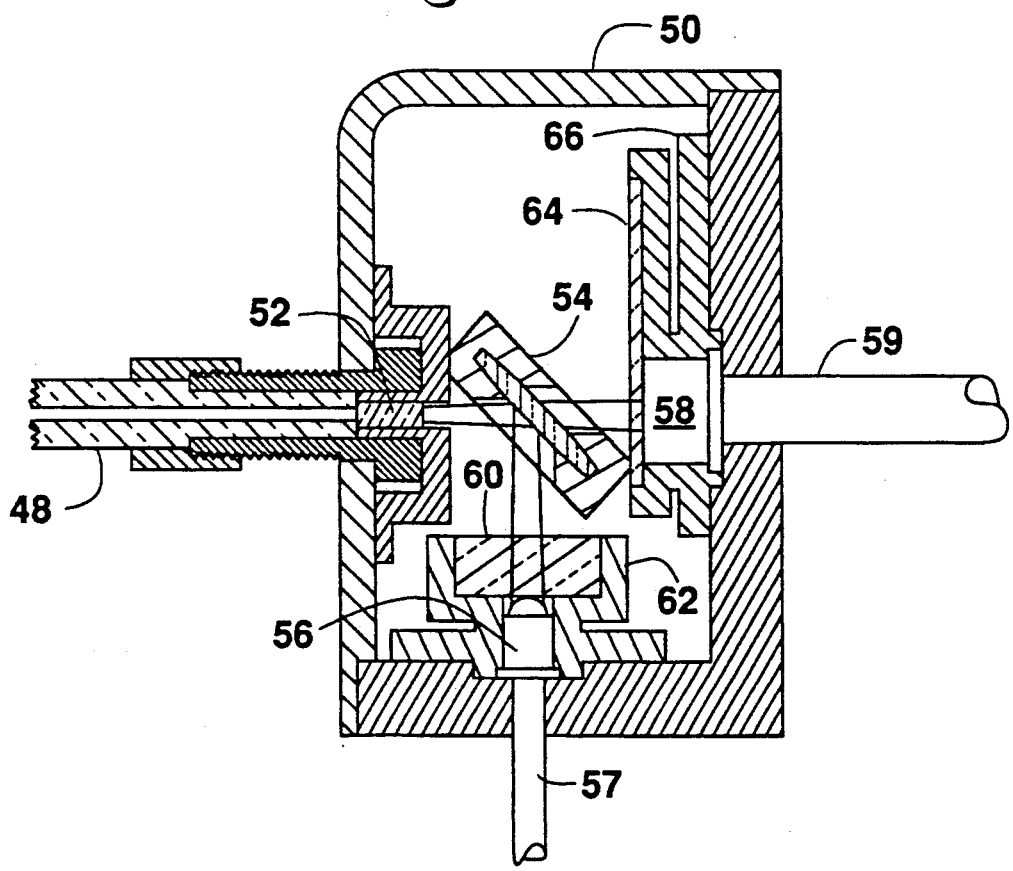
FIG. 4 is an elevational cross sectional side view of one of the detectors used in the optical sensor system of the present invention.
Figure 5:
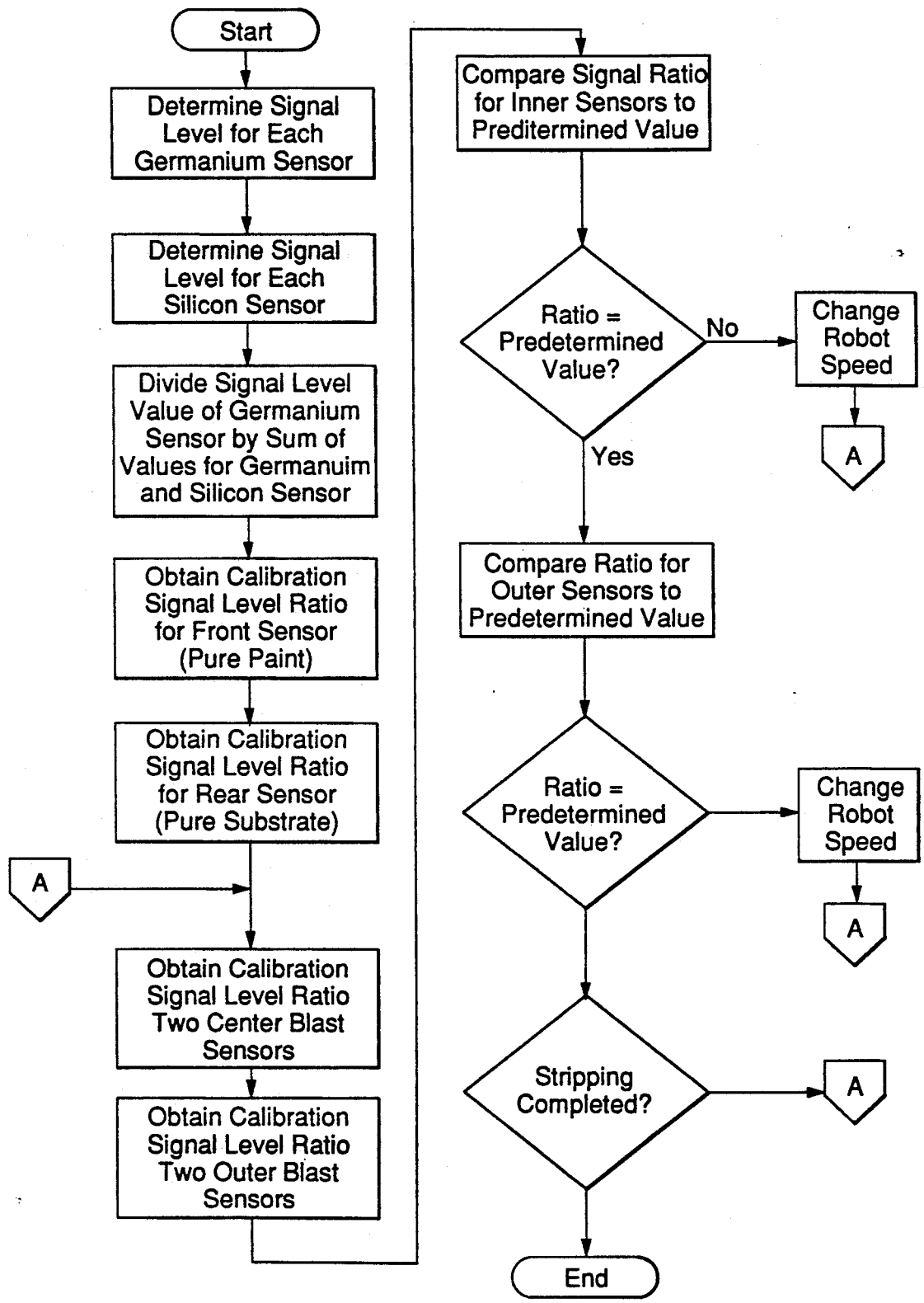
FIG. 5 is a process flow chart showing the processing steps implemented by the process control algorithm of the present invention.

Referring again to FIG. 1, the fiber optic bundle 16 comprises a plurality of fiber optic cables 48 of the type shown in FIG. 4. The optical signals transmitted in the fiber optic cables are converted into electrical signals by a plurality of detector elements contained in the detector module 18. FIG. 5 is a cross sectional view of a detector element of the type employed in the present invention. The fiber optic cable 48 containing the signal from the optical sensing element 32 is connected to the housing 50 in an appropriate manner. The light signal emitted by the fiber optic cable 48 is focussed by a collimating lens 52 which is operably connected to the end of cable 48. The focussed light beam is directed toward a beam splitter 54 to direct a portion of the optical signal toward first and second detectors 56 and 58, respectively. A first optical filter 60 is secured within a mounting bracket 62 to filter the portion of the light beam detected by optical detector 56. Likewise, an optical filter 64 is secure within mounting bracket 66 to filter the portion of the light beam detected by optical detector 58.

In order to ensure effective operation of the sensor, there must be a comparatively wide separation between the wavelengths of the first and second detectors. In the preferred embodiment of the invention, sensors capable of operating in the infrared region are employed. In the preferred embodiment of the invention, the first optical sensor 56 is a silicon photodiode and the second optical sensor 58 is a germanium photodiode. The silicon and germanium photodiodes have a comparatively large difference in their operating wavelengths, thus improving the distinction between the respective optical signals for paint and substrate. The first optical filter used in the preferred embodiment is an 800 nanometer highpass filter. The second optical filter is a 1600 nanometer highpass filter. In order for the sensor system to operate properly, the output of the gain stages of the germanium and silicon photodiodes must be adjusted to comparable voltages. Since the sensors do not have the same sensitivity, the gain of the amplifiers contained in the two detectors must be normalized.

The material reflecting light into the sensor can be identified by the relative amplitudes of the signals from the 900 nm and 1700 nm detectors. To determine the relative amplitudes, the output voltage of the gain amplifier for the long wavelength sensor is divided by the sum of the output voltages of the gain amplifiers of both the short and long wavelength detectors. This ratio is independent of the intensity of the illuminating light source and can be used to determine the type of material reflecting the light.

The sensor must be calibrated to compensate for the spectral emission of the illuminating light source. This is done by placing the sensor so that its field of view contains a typical paint sample. An average of several ratios is taken and stored as a typical paint ratio. The sensor field of view is then set to contain a typical substrate sample. An average of several ratios is again taken and stored as a typical substrate ratio. A field of view that contains part paint and part substrate will have a ratio that falls somewhere between the all paint and the all substrate ratios. The amount of difference between the two calibration ratios will provide the percentage of paint or aluminum. For example, if the paint ratio was 0.200, the aluminum, ratio was 0.500 and the sampled ratio was 0.350 the sensor would be looking at half paint and half aluminum. This effect is achieved because the sensor detects the average intensity at each of the wave lengths in the field of view. To control the process in real time, the first and second calibration sensors are used to calibrate for small variation in the surface due to changes in the paint, substrate or environment. The leading sensor will "see" all paint and the trailing sensor will "see" all substrate.

FIG. 5 is a flowchart representation of the processing steps implemented by the system control software. In steps 100 and 102, the signal levels are determined for each of the germanium and silicon sensors in the detector elements. In step 104, the value of the signal level of the germanium sensor divided by a value equal to the sum of the combined values of the signal levels for the germanium and silicon sensors. This value is an intensity independent ratio directly related to the difference between the two sensor values. Once all of the ratios are computed, the percentage of paint and substrate are determined. This is done by using the calibration sensor ratios to provide information relating to the condition of the surface. Thus, as indicated in steps 106 and 108, calibration signal level ratios are obtained for the front sensor (pure paint) and the rear sensor (pure substrate). For the ideal case, it is assumed that the calibration sensor that is before the blast nozzles will see only paint and the calibration sensor which is behind the blast nozzles will see only substrate. If the calibration sensor ratios are too far off the calibration values determined from the sample panels, then the calibration values from the sample panels are used by the system. Otherwise, the calibration sensors are used to compare the signal values from the sensing elements 33c–33f to determine the relative percent of paint on the substrate. In step 110, the signal level ratio for the two center blast sensors is determined and, likewise, this signal ratio is calculated for the two outer blast sensors in step 112. In step 114, the signal ratio for the two inner sensors is compared to a predetermined value and in step 116 a determination is made as to whether this ratio is equal to the predetermined value. If it is determined that the ratio does not equal the predetermined value, then the robot speed is changed in step 118 and the control software returns to reference mark A to repeat steps 110–116. However, if it is determined that the ratio is equal to the present value, then the system proceeds to step 120 where the ratio for the outer sensors is compared to the predetermined value. In step 122 a determination is made of whether the ratio is equal to the predetermined value. If the ratio is not equal to the predetermined value, then the robot speed is adjusted in step 124 and the system again returns to step 110. If however, it is determined that the ratio is equal to the predetermined value, the system proceeds to step 126 where a determination is made of whether the stripping process is completed. If the stripping is not completed, the system return to step 110.

Although the method and apparatus of the present invention has been described in connection with the preferred embodiment, it is not intended to be limited to the specific form set forth herein, but on the contrary, it is intended to cover such modifications, alternatives and equivalents as can reasonably be included within the spirit and scope of the claims.

What is claimed is:

1. An optical sensor system for detecting the quantity of a substantially opaque protective coating, such as paint, deposited on the surface of a substrate, comprising:

means for illuminating said surface of said substrate with a quantity of light;

a plurality of optical sensing elements for detecting a portion of said light
reflected by said substrate and for producing a plurality of optical
signals in response thereto;

means for detecting said plurality of said optical signals and for producing a
plurality of electrical data signals in response thereto; and data processing means for processing said data signals and for producing an
indication of the quantity of said opaque protective coating deposited
on said substrate.

2. The optical sensor system according to claim 1, said means for illuminating said substrate comprising a light source for producing infrared rich light.

3. The optical sensor system according to claim 2, said detector means comprising a plurality of optical detector elements each said detector element comprising first and second photosensitive detectors.

4. The optical system according to claim 3, said first and second optical detectors comprising said first and second photodiodes, said first photodiode being responsive to light in a spectral band centered at 900 nanometers, said second photodiode being responsive to light in a spectral band centered at 1700 nanometers.

5. The optical sensor system according to claim 4, each of said detector elements comprising first and second optical filters for filtering light detected by said first and second photodiodes.

6. The optical sensor system according to claim 5, said first optical filter being an 800 nanometer highpass filter, said second optical filter being a 1600 nanometer highpass filter.

7. The optical sensor system according to claim 6, each said detector element comprising a beam splitter for directing a first portion of said optical signal to said first photodiode, and for directing a second portion of said optical signal to said second photodiode.

8. The optical sensor system according to claim 7, wherein said plurality of optical sensing elements are contained within a stripping head assembly, said stripping head assembly being provided with a plurality of nozzles for directing stripping material toward said substrate.

9. The optical sensor system according to claim 8, wherein some of said plurality of optical sensing elements are interposed between said nozzles for delivering said stripping material to said substrate, with said optical sensing elements having a field of view corresponding approximately to the stripping area of each of said nozzles for delivering said stripping material.

* * * * *